United States Patent Office 3,311,954
Patented Apr. 4, 1967

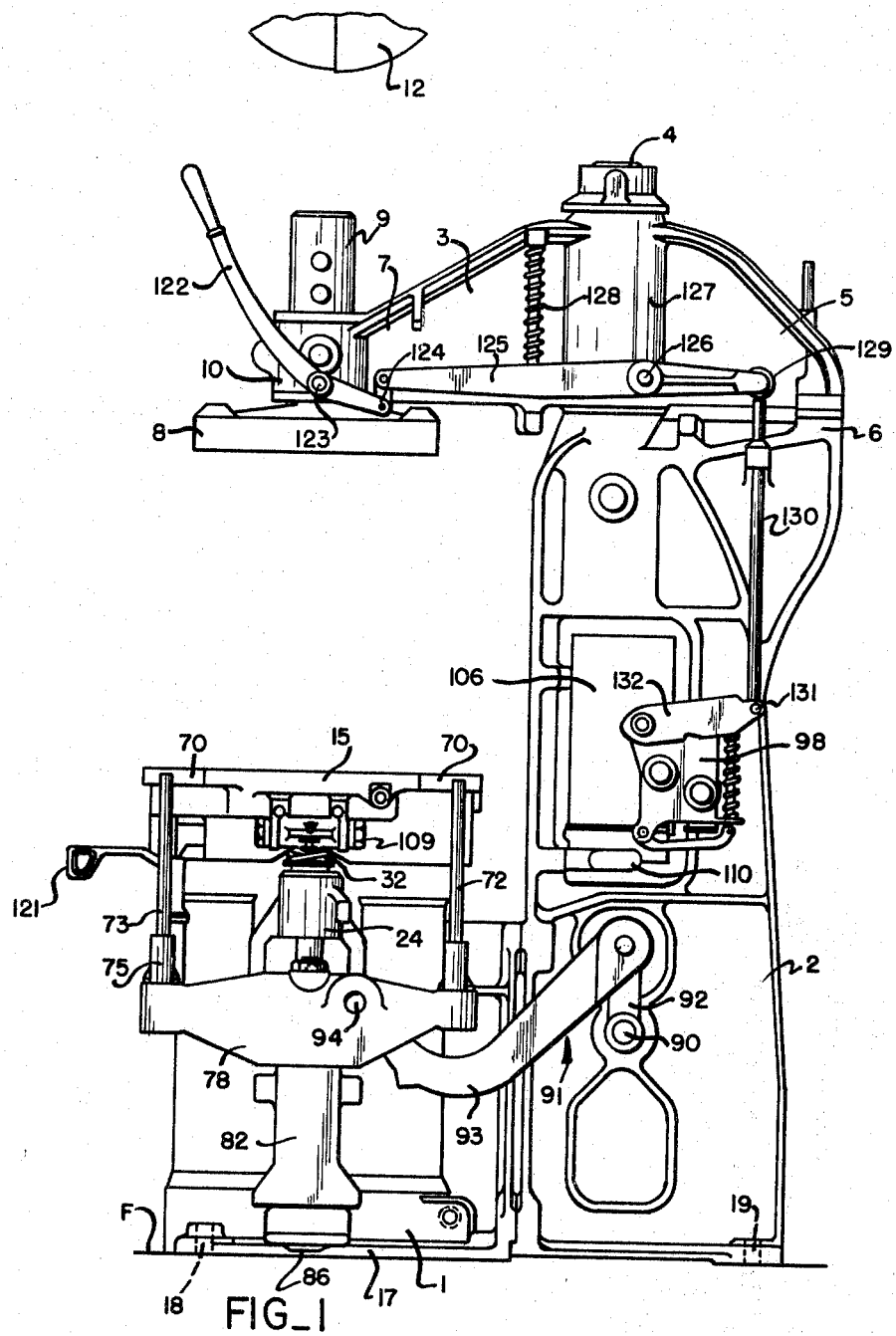
FIG_1

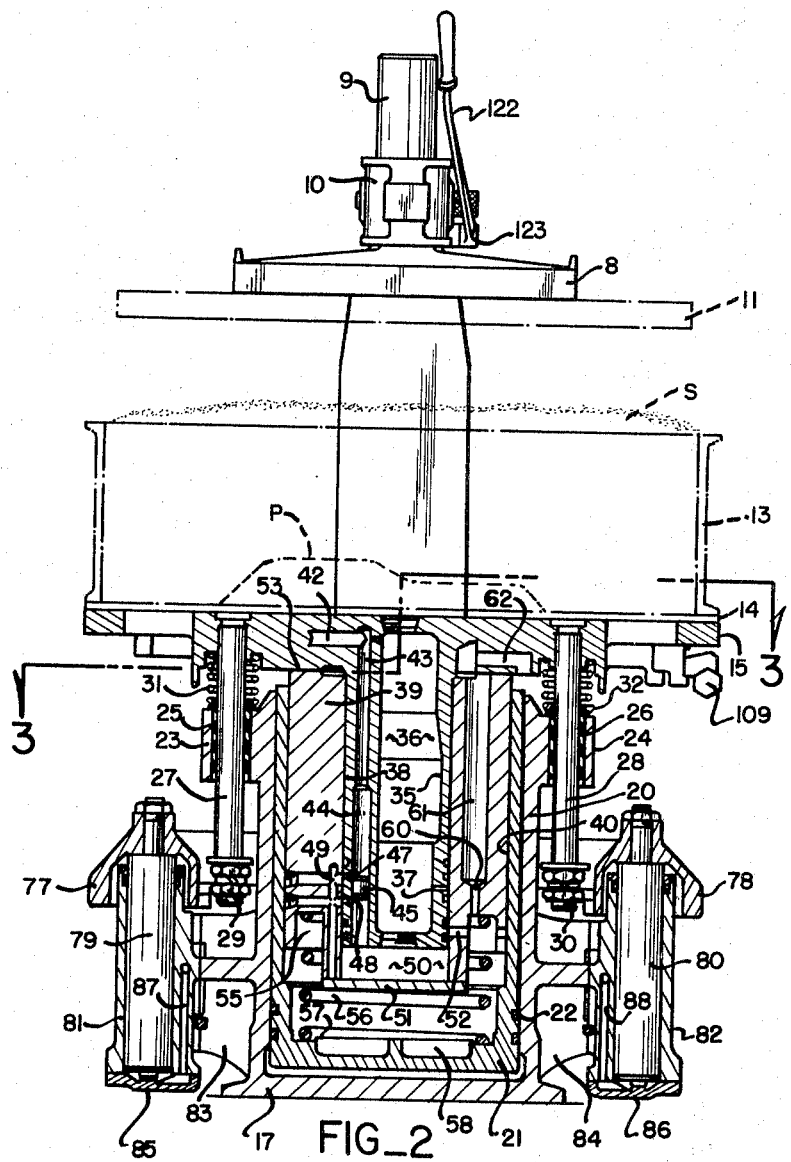
FIG_2

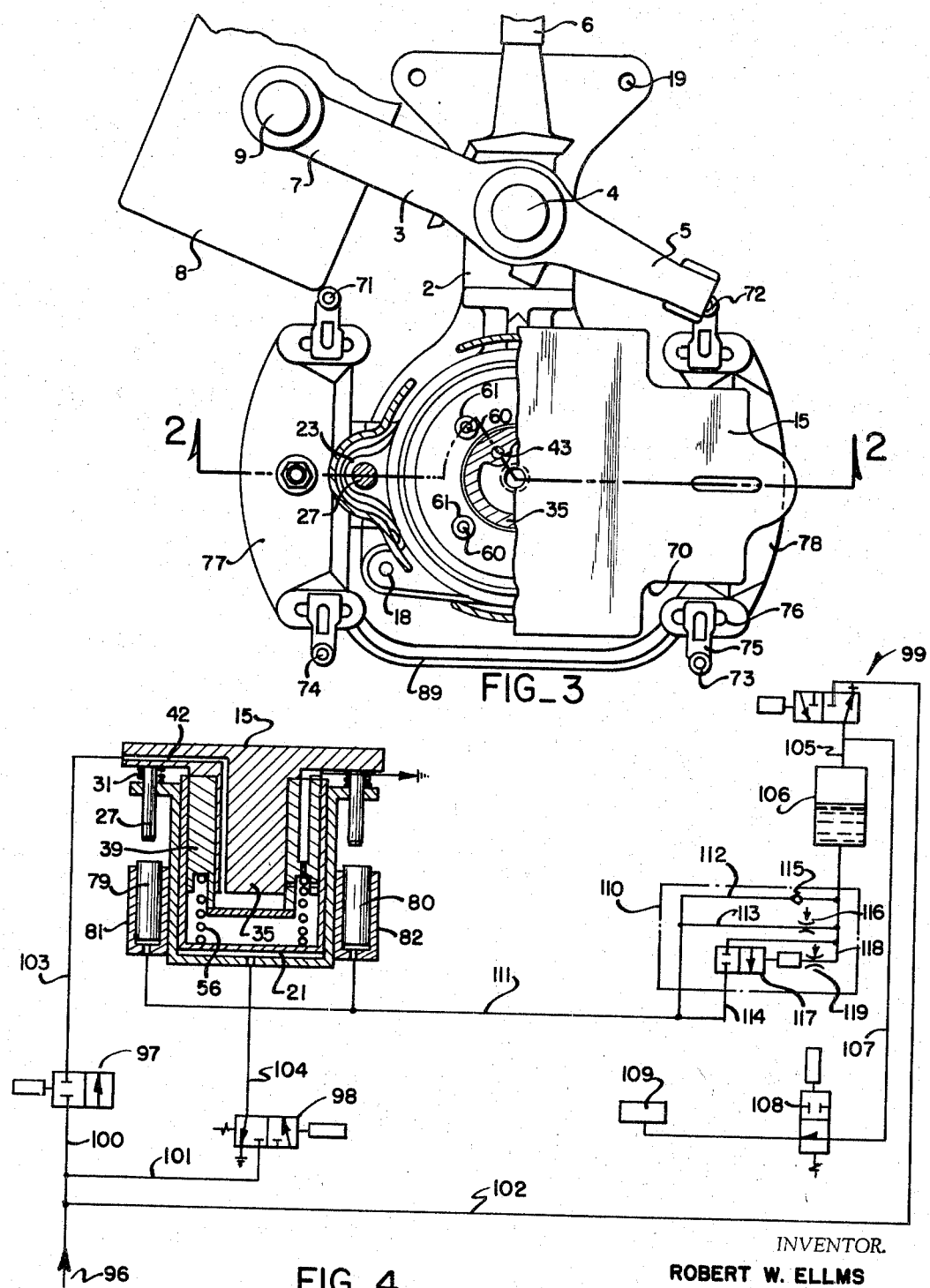

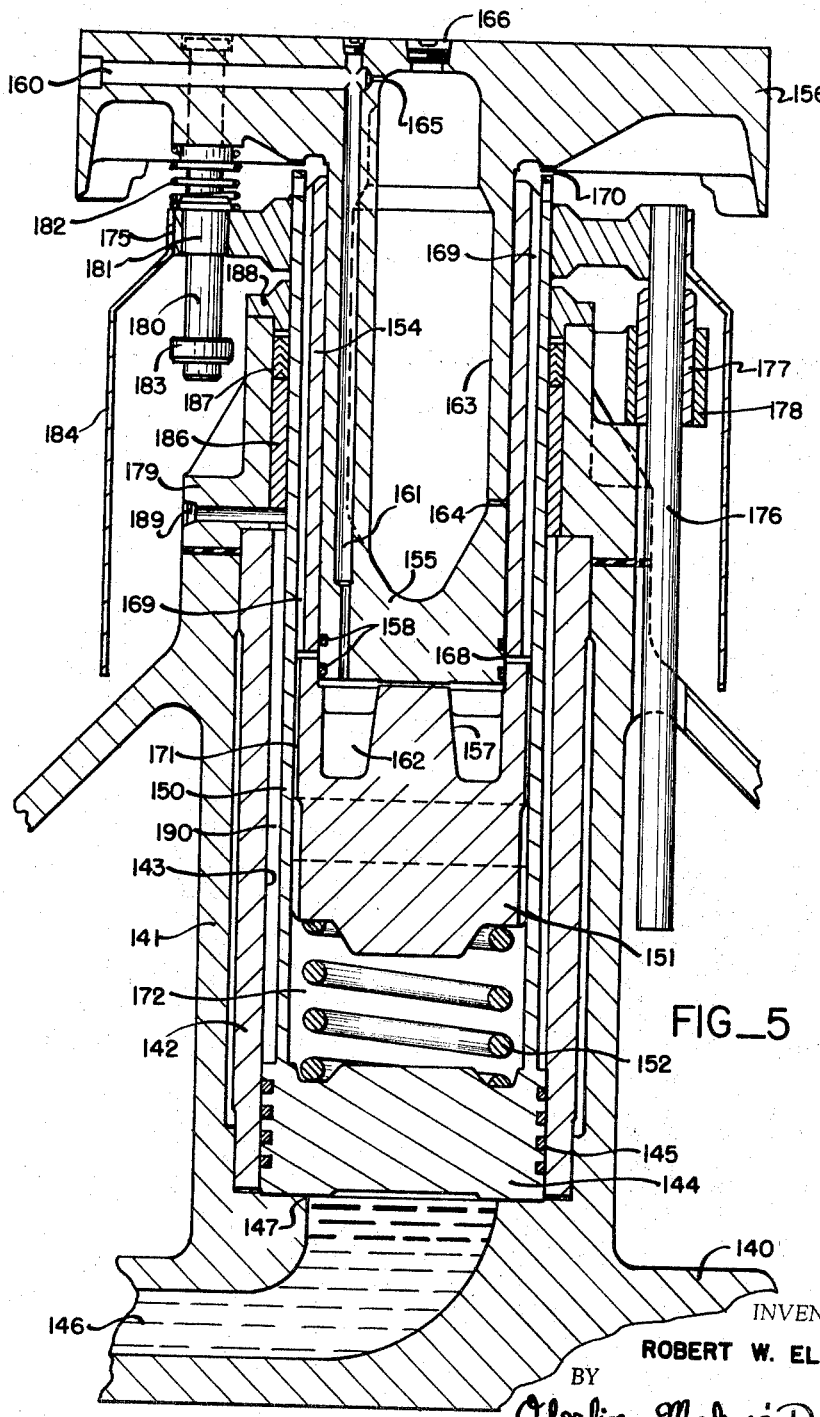
FIG_5

3,311,954
SHOCKLESS JOLT MOLDING MACHINE
Robert W. Ellms, North Olmsted, Ohio, assignor to The Osborn Manufacturing Company, Cleveland, Ohio, a corporation of Ohio
Filed Nov. 8, 1963, Ser. No. 322,405
6 Claims. (Cl. 22—45)

This invention relates as indicated to a molding machine and more particularly to a shockless jolt-squeeze foundry molding machine capable of rapidly jolting and mechanically squeezing a sand foundry mold to the desired hardness.

Conventional jolt molding machines generally require very sturdy base structures and foundation sub-structures in order to absorb the tremendous jolts occasioned during the jolting operation. Such jolt machines have been known to damage both the plant and adjacent machinery due to the tremendous impact caused thereby. Moreover, quite complex machines have been required both to jolt and then mechanically squeeze the mold in order to obtain a mold of the desired hardness.

It is accordingly a principal object of the present invention to provide a simplified foundry molding machine which will have the requisite jolt action and yet will not create undesirable noise and impact to sub-structures, plant and surrounding machinery.

A further principal object is the provision of a foundry molding machine which can simultaneously jolt and mechanically squeeze a sand mold more quickly and efficiently to ram such mold.

Another object is the provision of a shockless jolt foundry molding machine in which nearly constant table height can be maintained for various weights of patterns, flasks and sand.

Still another object is the provision of a shockless jolt foundry molding machine utilizing a large shockless operating spring between the jolt ram and the squeeze piston absorbing noise and impact otherwise transmitted to the sub-structure.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a side elevation of one form of foundry molding machine in accordance with the present invention;

FIG. 2 is a vertical section of the machine taken substantially on the line 2—2 of FIG. 3;

FIG. 3 is a horizontal section taken substantially on the line 3—3 of FIG. 2;

FIG. 4 is a schematic diagram of the air and hydraulic fluid controls of the machine embodiment illustrated in FIGS. 1 to 3; and FIG. 5 is an enlarged fragmentary vertical section of the table and jolt mechanism of a larger capacity molding machine wherein the shockless jolt mechanism is supported on an oil column and utilizes a bottom strike.

Referring now to the annexed drawings and more particularly to FIGS. 1 to 3, there is illustrated a machine which comprises a table or base frame 1 joined at the rear thereof to a squeeze head frame 2 supporting at the top thereof a squeeze head arm 3 mounted for horizontal swinging movement about the axis of pin 4 projecting from the top of frame 2. A suitable thrust bearing may be employed to mount such arm on the top of the frame 2 and such arm includes a rearwardly projecting portion 5 adapted to overlie a similarly rearwardly projecting portion 6 of the frame 2 to take part of the load otherwise placed upon the thrust bearing supporting such arm for swinging movement. The front or forwardly projecting portion 7 of the arm supports squeeze head 8 on a vertically extending pin 9 passing through hub 10 on the forward end of the arm. The squeeze head 8 which may have a squeeze board 11, indicated in phantom lines in FIG. 2 secured thereto, may be raised and lowered by adjustment of the post 9 within the hub 10. The squeeze head 8 is thus mounted for horizontal swinging movement from a forwardly projecting squeeze position to an offset position indicated in FIG. 3 permitting sand S to be dumped from overhead hopper 12 into a flask 13 which may be mounted on pattern plate 14 in turn mounted on table 15 supported on the table frame 1 directly beneath the hopper 12 and the squeeze head in its squeeze position.

The table base frame 1 includes a bottom portion 17 which may be secured to the floor F by means of suitable fasteners passing through apertures 18 indicated in FIG. 3 just as the squeeze head frame 2 may be secured to such floor by suitable fasteners through apertures 19. A cylindrical housing 20 projects upwardly from the base portion 17 containing cylindrical squeeze piston 21 having annular seals 22 therein providing a sliding fluid seal between the cylinder 20 and the piston 21. The cylindrical portion 20 includes two laterally projecting hubs 23 and 24 receiving therethrough in sleeve bearings 25 and 26 guide rods 27 and 28, respectively. The tops of such guide rods are secured in recessed manner to the table 15 and the bottoms are provided with stop nuts 29 and 30, respectively. Compensating compression springs 31 and 32 surround the rods 27 and 28 between the tops of the hubs 23 and 24 and the bottom of the table 15 is thus in part resiliently supported by the compensating springs 31 and 32.

The table 15 includes a centrally disposed vertically extending jolt piston 35 which has therein a jolt oil cavity 36 which may be plugged at the top and bottom ends thereof. Lateral passageways 37 are provided communicating the cavity 36 with the exterior of the piston to provide lubrication in the conventional manner. The jolt piston 35 is received within the center cylindrical bore 38 of a shockless ram piston 39 which is in turn received in cylindrical bore 40 in the squeeze piston 21.

A horizontal air inlet 42 is provided in the jolt table 15 which communicates with a vertical passage 43 enlarged at 44 and provided with a plug 45 therein. The wall of the jolt piston 35 is provided with apertures 47 and 48 above and below the plug 45, respectively, which communicate with by-pass passage 49 in the shockless ram piston 39. Accordingly, air pressure supplied to the jolt table through the horizontal passage 42 will pass down through the passages 43 and 44, through the port 47, the by-pass passage 49, the port 48 and the lower portion of passage 44 beneath the plug 45 to enter the chamber 50 beneath the jolt piston within the bottom of the shockless ram piston 39, which is closed by bottom plate 51. Air pressure in the chamber 50 will cause the jolt piston to rise and movement of the ports 47 and 48 will then block further air pressure being applied through the by-pass passage 49. The jolt piston and table will continue to rise until exhaust port 52 is opened permitting the table to drop with the table 15 striking the top of the shockless ram piston 39 as indicated at 53 to provide a top strike jolt action. The bottom of the shockless jolt piston 39 is provided with an annular recess 55 which receives the upper end of main shockless operating spring 56 which is seated on shoulder 57 on the bottom of the squeeze piston 21.

The exhaust ports 52, which may be, for example, three in number arranged peripherally of the shockless ram piston 39, communicate with such annular recess and thus with chamber 58 between the bottom of the squeeze piston 21 and the bottom of the shockless ram piston 39. Such exhaust ports also communicate through restricted openings 60 in vertical passages 61 with jolt air exhaust ports 52 in the table 15. Accordingly, the jolt exhaust escape passage is restricted to increase the pressure of the exhaust air flow beneath the shockless ram piston 39 permitting the ram piston to move upwardly with the assistance of the main shockless operating spring 56.

The configuration of the table 15 can be seen more clearly in FIG. 3 and such is provided with corner recesses 70 accommodating flask supporting draw pins 71, 72, 73 and 74 at each corner of the table. Such draw pins may be supported by draw pin brackets 75 which may be adjustably mounted in slots 76 provided at each end of draw frames 77 and 78 supported on draw pistons 79 and 80, respectively. (See FIG. 2.) Such draw pistons are mounted in cylindrical housings 81 and 82 mounted on laterally projecting portions 83 and 84, respectively, of the center cylindrical housing 20 of the table base frame 1. The bottoms of the cylindrical housings 81 and 82 are closed by cover plates 85 and 86, respectively, and passages 87 and 88 are provided in the respective housings for communication of fluid pressure to the bottoms of the pistons 79 and 80 to obtain vertical movement thereof and thus the draw frames 77 and 78. Such draw frames may be interconnected at the front of the machine by frame 89 as well as a squaring mechanism indicated more clearly in FIG. 1. Such squaring mechanism includes a squaring shaft 90 extending through the squeeze head frame 2 and bell crank arms 91 having relatively short arms 92 keyed to such shaft and the longer arms 93 thereof pivoted at 94 to the draw frames. Such squaring mechanism thus ensures that the piston-cylinder assemblies raising and lowering the draw pins 71 through 74 will operate in unison.

Referring now more particularly to FIGS. 1 and 4, there are illustrated the basic controls for operation of the machine shown in FIGS. 1 and 3. Air pressure may be obtained from a convenient plant source 96 and supplied to manually operated shut-off type jolt valve 97, four-way manually operated squeeze valve 98, and four-way manually operated draw operating valve 99 through fluid pressure lines 100, 101 and 102, respectively. The jolt valve 97 in the open position simply supplies such air pressure to line 103 connected to the horizontal passage 42 in the jolt table. The squeeze valve 98 in the closed position will vent line 104 connected to the chamber beneath the squeeze piston 21 and when opened will supply air pressure to such line 104 to elevate the table and the flask supported thereon with the sand therein being brought into engagement with the squeeze board 11.

The draw operating valve 99, when closed, vents line 105 connected to the top of air-over-oil cylinder 106 and branch line 107 connected through manually operated shut-off valve 108 to pattern vibrator 109 which may be mounted on the underside of the table 15 as indicated in FIGS. 1 and 2. In the open position of such valve 99, air pressure will be supplied to the top of the body of oil in cylinder 106 to force the same through oil draw valve 110 and into branched line 111 connected to the bottoms of the draw pistons 79 and 80. Such oil draw valve includes parallel passages 112, 113 and 114 for passage of oil therethrough with check valve 115 being provided in passage 112, restricted orifice valve 116 being provided in passage 113 and shut-off valve 117 being provided in passage 114. The shut-off valve 117 is operated by a pilot line 118 having restricted orifice valve 119 therein which is operative to control the shifting of the valve 117 from the line closing to line opening position. The valve 108 may be mechanically operated in response to critical position of the table so that the vibrator 109 will be actuated only during the drawing of the pattern from the finished mold.

The jolt and draw valves 97 and 99 may be mounted on the front of the machine and operated manually through levers as indicated at 121 in FIG. 1. The squeeze valve 98 may be located on the side of the squeeze head frame 2 and operated by arm 122 pivoted at 123 to the hub 10 on the end of the squeeze head arm 3. The other end of the operating handle 122 is connected through short link 124 to spring loaded rocker arm 125 intermediately pivoted at 126 to the hub 127 of the arm 3 housing the pivot pin 4. A compression spring 128 serves to bias the rocker arm 125 in a counterclockwise direction as viewed in FIG. 1 and thus the handle 122 in a clockwise direction. The rear end of the rocker arm is provided with a roller 129 which, when the operating handle 122 is pulled down, will depress the valve operating rod 130 pivoted at 131 to valve operating member 132. The oil reservoir 106 will be mounted in the frame 2 and the oil draw valve 110 may be mounted on the side of such frame adjacent the squeeze valve 98.

OPERATION OF THE EMBODIMENT
ILLUSTRATED IN FIGS. 1 TO 3

After the pattern plate 14 having pattern P thereon is securely fastened to the jolt table 15 and a flask 13 is located on the pattern plate, sand S is loaded into the flask from the overhead hopper 12 with the squeeze head, of course, being swung to the out-of-the-way position illustrated in FIG. 3. Jolt valve 97 is now manually energized allowing live air to flow through the jolt table and jolt piston. Such air is directed through the by-pass passage 49 in the shockless ram piston 39 and back into the jolt piston causing the jolt table to rise. When the ports 47 and 48 are blocked and the exhaust port 52 is opened, jolt air will be exhausted into the chamber 58. Also, as air pressure is building up in the chamber 50, prior to exhaustion, the ram piston 39 will be driven downwardly compressing the main operating spring 56. The exhaust escape passage, being restricted at 60, causes an increase in the pressure in chamber 58 beneath the ram piston 39 and this exhaust air assists the main shockless operating spring 56 in driving the ram piston 39 upwardly. Simultaneously, due to the jolt air being exhausted, the jolt table 15 starts downwardly and the meeting of the table and ram piston 39 and 53 causes a jolting action. Accordingly, the ram piston 39 rises to meet the descending jolt table nevertheless providing a foundry jolt which will be sufficient properly to jolt ram the sand and yet such jolt will not be transmitted to the squeeze piston 21 and the supporting cylindrical casing 20 of the table base frame 1.

When the table 15 started downwardly, exhaust port 52 is again closed and the air passage 49 being aligned with the ports 47 and 48 again supplies jolt air pressure to the chamber 50 causing a repeat of the above-described jolt operation. After the required number of jolts, the jolt valve may be manually deenergized.

The sand S will now be struck from the flask 13 and the squeeze head 8 with the squeeze board 11 thereon swung into squeeze position directly over the flask. The operator may now pull down the lever 122 manually to energize the squeeze valve 98 causing air pressure to flow beneath the squeeze piston 21 and elevate the table 15 and thus the sand filled mold box against the squeeze board. After the sand has thus been mechanically rammed, the squeeze valve 98 may be shifted venting the line 104 causing the table 15 to descend to its original position. The draw valve 99 may now be energized forcing oil from the reservoir 106 through slow draw valve 116 causing the draw pistons 79 and 80 to raise slowly and simultaneously pressurizing the line 107 through open valve 108 to actuate vibrator 109. The draw pins 71 through 74 will now move upwardly slowly engaging the bottom edge of the flask 13 to draw the pattern P from the mold produced. Oil passes through restricted orifice valve 119 to shift the valve 117 on slight delay to open line 114 to permit the draw pins to raise at a more rapid rate. The operator may then remove the finished mold, shift the valve 99 and then repeat the above-described cycle.

As an alternative method of operation, the operator may first load the flask with sand and then move the squeeze board 11 into squeeze position, actuate the squeeze valve 98 to elevate the table with the sand within the flask against the squeeze board and while such squeeze operation is being performed energize the jolt valve 97 so that the jolting and squeezing of the mold can be done simultaneously. After the simultaneous jolting and squeezing operation, the valves 97 and 98 may be manually deenergized and the squeeze piston will descend and the table 15 returns to its normal position with the table, pattern, flask and mold in the down position. The manually operated draw valve is then energized causing the air to force oil through the oil draw valve 110 causing the draw frame and draw pins to move upwardly stripping the mold and flask from the pattern. It is noted that the length of the slow and fast draw is controlled by the oil draw valve and these periods of time can be adjusted for various operating conditions. After the mold has been removed and the draw pins and draw frame returned to their original position as the oil flows back to the tank 106 by gravity, a new flask is placed on the pattern plate and the machine is ready for a repeat operation.

The compensating springs 31 and 32 which are located beneath the jolt table 15 surrounding the guide pins 27 and 28 maintain a nearly constant table height for various weights of patterns, flask and sand and the springs act to relieve a portion of the load on the main shockless operating spring 56. The strength and resilient characteristics of the large spring 56 will, of course, be chosen to do the work required. Moreover, the natural frequency of such spring may be such that the jolt table will be in effect resonate therewith.

FIG. 5 EMBODIMENT

Referring now to the embodiment of the invention illustrated in FIG. 5, a table base frame 140 includes a center cylindrical portion 141 in which is mounted a sleeve or cylindrical retainer 142 having bore 143 therein receiving squeeze piston 144. Fluid seal rings 145 may be provided in such piston to obtain the desired sliding seal between the piston 144 and the cylinder 142. A fairly large diameter oil passage 146 terminates in a large port 147 in the bottom of the cylinder providing hydraulic fluid communication to the bottom of the piston 144 within its cylindrical retainer.

The piston 144 is provided with upstanding annular cylindrical housing 150, the inner bore of which receives vertically movable shockless piston 151 which is supported on the piston 144 by large coil spring 152. The shockless spring 152 may be formed of very heavy wire such as wire 1½ inches in diameter and may have five coils, three of which are active with ends squared and ground. The total load of the spring may be 9400 pounds. The shockless ram piston 151 includes an upstanding cylindrical portion 154 in which jolt piston 155 is mounted which projects centrally from the jolt table 156. The shockless ram piston is provided with an upstanding frusto-conical center projection 157 adapted to engage the bottom of the jolt piston 155 to provide a bottom strike jolt mechanism.

The jolt piston 155 is provided with sealing rings 158 providing a suitable sliding air seal between the jolt piston and the cylindrical wall 154 of the shockless ram piston 151. The table 156 is provided with a horizontal jolt air passage 160 communicating with a vertical passage 161 which opens into annular chamber 162 beneath the bottom of the jolt piston and within the shockless ram piston 151. The center of the jolt piston 155 is provided with a lubricating cavity 163 which may contain a lubricant forced outwardly through lubricating ports 164 by air pressure entering such cavity through port 165 in the top thereof communicating with the horizontal jolt air passage 160. Such cavity may be provided with a top access plug 166 as indicated. The jolt piston is thus similar to the jolt piston in the FIG. 2 embodiment, but the vertical passage 161 is not provided with the plug and the porting through a by-pass passage in the cylindrical wall of the shockless ram piston 151.

Exhaust ports 168 may be provided in the cylindrical wall 154 of the ram piston 151, such ports communicating with vertical passages 169 extending from such exhaust ports upwardly to exhaust the jolt air through annular restricted passage 170 between the top of the cylinder 154 and the bottom of the table 156. Such exhaust ports 168 also communicate with somewhat smaller passages 171 extending from the exhaust ports downwardly into communication with the chamber 172 housing the shockless spring 152 between the squeeze piston 144 and the shockless ram 151.

An annular retaining member 175 may be secured as by welding to the top of the cylindrical portion 150 of the squeeze piston 144 for vertical movement therewith. A guide rod 176 secured thereto projects downwardly through sleeve 177 secured to projection 178 extending from frame cap 179 which is mounted on the top of cylindrical portion 141 of table frame 140. The guide rod 176 projecting through the sleeve 177 serves to keep the piston 144 from rotating within its cylindrical retainer. The table 156 may be maintained against rotation by guide pins 180 projecting downwardly therefrom through sleeve 181 in the annular member 175, compensating compression springs 182 being provided between the member 175 and the bottom of the table 156 surrounding such guide pins. A stop collar 183 may be provided on the bottom of the guide pins 180. A hood or boot 184 may be secured to the annular member 175 projecting downwardly therefrom to protect the sliding parts of the machinery from dirt, loose sand and the like.

A sleeve bearing 186 is provided interiorly of the cap 179 and chevron packings 187 thereabove are held in place by retainer ring 188. A lateral passage 189 in the cap 179 communicates with the annular space 190 above the squeeze piston 144 between the cylinder 142 and the upstanding cylindrical projection 150 of the squeeze piston. In this manner, such space may be vented or air pressure may be applied thereto to drive the squeeze piston downwardly and the hydraulic fluid through the port 147 and passage 146 in the table base frame 140.

The operation of the FIG. 5 embodiment may be substantially similar to that of the embodiment shown in FIGS. 1 to 3. After a pattern plate with a pattern thereon is securely fastened to the table 156, hydraulic fluid may be supplied through the passage 146 to elevate the piston 144 and thus the table 156 to assemble the pattern plate with a flask. Through suitable valving, the volume of hydraulic fluid supporting the piston will be locked and sand may then be dumped into the flask. The squeeze piston 144 will then be firmly supported on a fixed volume column of hydraulic fluid. The jolt valve is then energized permitting air to flow through passages 160 and 161 into annular chamber 162 causing the jolt piston 155 and thus the table 156 to elevate until the exhaust ports 168 are uncovered. Pressure within chamber 162 will not only cause the piston 155 to elevate but the shockless ram 151 to descend compressing spring 152. When the exhaust ports 168 are uncovered, the jolt piston 155 and table 156 will drop and the spring 152 will drive the piston 151 upwardly causing the frusto-conical projection 157 to meet the bottom of the jolt piston 155 obtaining a bottom strike jolt impact. Exhaust air from the jolt operation will flow outwardly through the passages 169 through the restricted annular passage 170 to atmosphere. It will be appreciated that the relative size of the passages 169 and 171 do not avail the jolt exhaust to assist the spring 152 in driving the ram 151 upwardly to obtain the shockless jolt. However, by varying the relative sizes of the passageways, it will be understood that such jolt exhaust pressure may readily be employed to assist the operation of the spring 152. The jolt operation may continue to the extent desired and compensating springs 182 will serve to relieve a portion of the load on the main shockless operating spring 152. These compensating springs also maintain a nearly constant table height for various weights of patterns, flask and sand on the table. When the jolting operation is completed, the hydraulic fluid pressure 146 may be increased further to raise the table 156 mechanically to squeeze the sand within the flask against a squeeze head. When the mechanical squeeze operation is complete, air may be supplied through port 189 to assist the downward vertical movement of the squeeze piston and continued downward vertical movement of the table 156 will draw the pattern from the mold.

Alternatively, it will be appreciated that the squeeze piston 144 may be elevated to pick up the flask and that the flask may be filled with sand and moved against a fixed squeeze head during the jolt operation. In this manner, the jolt action can be performed as the squeeze pressure is being applied to the squeeze piston 144. Reference may be had to the copending application of Leon F. Miller et al., Ser. No. 252,644, filed Jan. 21, 1963, now Patent No. 3,205,542, for "Molding Machine" for a more complete disclosure of the type of foundry molding machine with which the FIG. 5 embodiment of the present invention may be employed.

It can now be seen that there is provided a shockless jolt-squeeze molding machine which will not require extremely heavy sub-structures heretofore necessary for conventional type jolt machines and which is capable of being operated either first to jolt and then mechanically squeeze the mold or simultaneously to jolt and squeeze the mold.

Other modes of applying the principle of the invention may be employed, change being made as regards the details described, provided the features stated in any of the following claims or the equivalent of such be employed.

I, therefore, particularly point out and distinctly claim as my invention:

1. A foundry molding machine comprising a table including a vertical jolt piston extending therebeneath, a ram piston having a cylindrical recess receiving said jolt piston, a squeeze piston having a cylindrical recess receiving said ram piston, operating spring means supporting said ram piston in said squeeze piston, means operative to supply air under pressure between said jolt and ram pistons to move said jolt piston upwardly and said ram piston downwardly compressing said operating spring means, means operative to exhaust such air under pressure to cause said jolt piston to drop and said spring means to move said ram piston upwardly to provide a shockless jolt impact, and compensating spring means substantially smaller than said operating spring means supporting said table in its lowermost position operative to relieve a portion of the load on said operating spring, said table in such lowermost position being supported solely by said compensating and operating springs.

2. A foundry molding machine as set forth in claim 1 including means to supply fluid under pressure beneath said squeeze piston operative vertically to elevate said squeeze piston and thus said table thereby mechanically to squeeze sand within a flask thereon.

3. A foundry molding machine as set forth in claim 2 wherein said means operative to supply air under pressure between said jolt and ram pistons comprises a horizontal passage in said table and a vertical passage in said jolt piston communicating with the bottom thereof.

4. A foundry molding machine as set forth in claim 3 wherein said means operative to exhaust such air under pressure comprises exhaust ports, and vertically extending passages in said ram piston communicating with the bottom thereof.

5. A foundry molding machine as set forth in claim 4 including a restriction in said vertically extending passages in said ram piston operative to supply air under pressure beneath said ram piston to assist said operating spring in moving said ram piston upwardly.

6. A foundry molding machine as set forth in claim 5 including a branch passage in said ram piston, porting interconnecting said branch passage and said vertically extending passage in said jolt piston operative to close said vertically extending passage therein when said exhaust ports are opened.

References Cited by the Examiner
UNITED STATES PATENTS

| 1,605,096 | 11/1926 | Campbell | 22—45 |
| 3,111,730 | 11/1963 | Ivarsson | 22—45 |

FOREIGN PATENTS

| 284,381 | 5/1915 | Germany. |
| 380,840 | 9/1923 | Germany. |
| 438,394 | 11/1935 | Great Britain. |
| 501,529 | 2/1939 | Great Britain. |

J. SPENCER OVERHOLSER, *Primary Examiner.*

MARCUS U. LYONS, *Examiner.*

E. MAR, *Assistant Examiner.*